(12) United States Patent
Lee et al.

(10) Patent No.: US 8,736,927 B2
(45) Date of Patent: May 27, 2014

(54) SCANNING DEVICE

(71) Applicant: Foxlink Image Technology Co., Ltd., New Taipei (TW)

(72) Inventors: Yueh-Shing Lee, New Taipei (TW); Shao-Yang Wu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 17 days.

(21) Appl. No.: 13/664,973

(22) Filed: Oct. 31, 2012

(65) Prior Publication Data

US 2014/0118803 A1 May 1, 2014

(51) Int. Cl.
*H04N 1/04* (2006.01)
(52) U.S. Cl.
USPC ............ 358/498; 358/474; 358/408; 358/488
(58) Field of Classification Search
USPC .......................... 358/498, 474, 408, 488, 497
See application file for complete search history.

(56) References Cited

U.S. PATENT DOCUMENTS

| | | | | |
|---|---|---|---|---|
| 7,617,985 B2 * | 11/2009 | van Os | ......................... | 235/475 |
| RE43,358 E * | 5/2012 | Fujikawa et al. | ............. | 358/474 |
| 8,395,826 B2 * | 3/2013 | Tan | ................. | 358/474 |
| 2002/0105686 A1 * | 8/2002 | Hasegawa et al. | ............ | 358/498 |
| 2012/0252587 A1 * | 10/2012 | Takikawa et al. | ............ | 464/68.8 |

* cited by examiner

*Primary Examiner* — Houshang Safaipour
(74) *Attorney, Agent, or Firm* — WPAT, P.C.; Anthony King

(57) ABSTRACT

A scanning device includes a scanning platform, a feed roller mounted above the scanning platform and rotatable to bring a sheet-like medium across the scanning platform, first and second elastic elements located under two ends of the scanning platform to press the scanning platform against the feed roller. One end of the scanning device near to the first elastic element is defined as a datum end for guiding the mediums to enter the scanning device. The first elastic element acts a greater force on the scanning platform than the second elastic element, or the distance from the first elastic element to the datum end is smaller than that from the second elastic element to the other end of the scanning device and the force from the first elastic element is equal to that from the second elastic element, so as to make the medium levelly transmitted during being scanned.

2 Claims, 5 Drawing Sheets

SCANNING DEVICE

BACKGROUND OF THE INVENTION

1. Field of the Invention

The present invention generally relates to a scanning device, and more particularly to a scanning device capable of effectively ensuring a scanning quality.

2. The Related Art

In order to use, storage and publish documents more efficiently and conveniently, ordinary documents written or printed on papers would be converted to digital data by virtue of a scanning device for the convenience of follow-up application.

Referring to FIG. 1 and FIG. 2, the conventional scanning device includes a scanning platform 91, a feed roller 92 rotatably mounted above the scanning platform 91, and two coil springs 93 located under two ends of the scanning platform 91 to press the scanning platform 91 against the feed roller 92. In order to miniaturize the scanning device, a large paper feed tray and a document feeder are excluded from the scanning device. So, when one sheet-like medium needs to be scanned, it will be inserted into a paper-feeding inlet 90 of the scanning device with one edge thereof being against one end sidewall of the paper-feeding inlet 90 so as to ensure the sheet-like medium is transmitted straightly in the process of being scanned. For example, the right end sidewall of the paper-feeding inlet 90 is defined as a datum end for guiding the insertion of the sheet-like medium. One of the coil springs 93 near to the datum end is designated as a first coil spring, and the other one is designated as a second coil spring. The two coil springs 93 are symmetrically located about the centerline of the long side of the scanning platform 91, and they are selfsame.

In use, the sheet-like medium is inserted into the paper-feeding inlet 90 with one edge thereof being against the datum end. Because the two coil springs 93 press the scanning platform 91 to clamp the sheet-like medium between the scanning platform 91 and the feed roller 92, the feed roller 92 rotates to bring the sheet-like medium through the scanning device by virtue of friction force of the feed roller 92 acting on the sheet-like medium. At the same time, one side of the sheet-like medium is scanned by the scanning platform 91 to be converted into a digital image.

When a common paper document 94 is scanned by the scanning device, since it has very thin thickness of about 0.1 mm, approximately equal positive force can be acted on stress areas of the paper document 94 to keep the paper document 94 level in the process of being scanned (as shown in FIG. 1). However, when a small card 95 having a thicker thickness, such as an identity card and a bank card, is scanned by the scanning device, the scanning platform 91 will slant by taking a bottom corner of the card 95 away from the datum end as a fulcrum, due to the card 95 being hard and thick. As shown in FIG. 2, the selfsame coil springs 93 both press the scanning platform 91 to clamp the small card 95 between the scanning platform 91 and the feed roller 92, but different moment arms L1, L2 are formed because the small card 95 is small, hard and thick. As a result, the torque applied by the second coil spring is greater than that applied by the first coil spring so that causes the scanning platform 91 to rotate clockwise at a slight angle until balance. So, a separation is formed between the small card 95 and a part of the scanning platform 91 near to the datum end of the scanning device. It results in nonuniform friction force acted on the small card 95 by the feed roller 92. Finally, the scanning device gets an askew digital image of one side of the small card 95.

In view of these disadvantages above, the conventional scanning device needs to be improved.

SUMMARY OF THE INVENTION

An objective of the present invention is to provide a scanning device capable of effectively ensuring a scanning quality.

To reach such purpose, a scanning device according to the present invention is described below. The scanning device has a paper-feeding inlet through which a sheet-like medium is inserted into and moves through the scanning device. The sheet-like mediums are substantially divided into two categories which are designated as first sheet-like mediums and second sheet-like mediums smaller and thicker than the first ones.

The scanning device includes a block-shaped scanning platform, a feed roller rotatably mounted above the scanning platform for clamping the sheet-like medium therebetween, a first elastic element and a second elastic element located under two opposite ends of the scanning platform to press the scanning platform upward against the feed roller. The force of the first elastic element acting on the scanning platform is greater than that of the second elastic element acting on the scanning platform. The scanning device defines a scanning direction along a long side of the scanning platform namely a long side of the paper-feeding inlet. In use, the feed roller rotates to bring the sheet-like medium across the scanning platform so as to make one side of the sheet-like medium be scanned by the scanning platform successively along the scanning direction and be converted into a digital image.

To reach such purpose, another scanning device according to the present invention is described below. The scanning device has a paper-feeding inlet through which a sheet-like medium is inserted into and moves through the scanning device. The sheet-like mediums are substantially divided into two categories which are designated as first sheet-like mediums and second sheet-like mediums smaller and thicker than the first ones.

The scanning device includes a block-shaped scanning platform, a feed roller rotatably mounted above the scanning platform for clamping the sheet-like medium therebetween, a first elastic element and a second elastic element located under two opposite ends of the scanning platform to press the scanning platform upward against the feed roller. The force of the first elastic element acting on the scanning platform is equal to that of the second elastic element acting on the scanning platform. One end sidewall of the paper-feeding inlet near to the first elastic element is defined as a datum end for guiding the sheet-like medium to be inserted into the paper-feeding inlet. The distance from the first elastic element to the datum end is smaller than that from the second elastic element to the other end sidewall of the paper-feeding inlet.

The scanning device defines a scanning direction along a long side of the scanning platform namely a long side of the paper-feeding inlet. In use, the feed roller rotates to bring the sheet-like medium across the scanning platform so as to make one side of the sheet-like medium be scanned by the scanning platform successively along the scanning direction and be converted into a digital image.

As described above, the scanning device of the present invention utilizes that the first elastic element near to the datum end of the scanning device acts a greater force on the scanning platform than the second elastic element to make the torques at two sides of the bottom corner of the second sheet-like medium balance, or that the distance from the first elastic element to the datum end is smaller than that from the second elastic element to the other end sidewall of the paper-feeding inlet to make the first elastic element directly act on the second sheet-like medium through the scanning platform, so as to ensure the second sheet-like medium is levelly transmitted in the process of being scanned. So, a good scanning quality can be finally achieved by the scanning device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
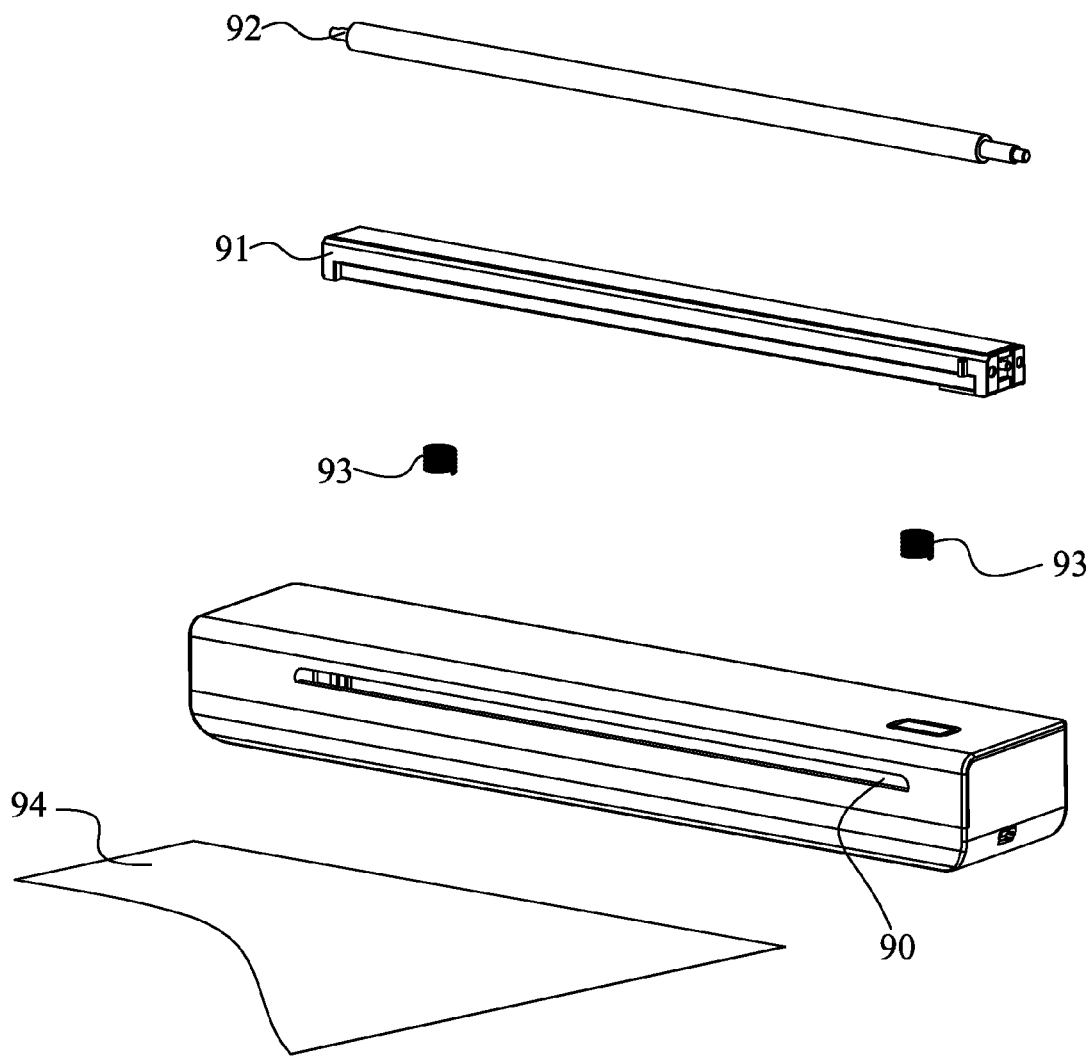
FIG. 1 is an exploded perspective view of a conventional scanning device, wherein a paper document will be scanned by the conventional scanning device.
Figure 2:
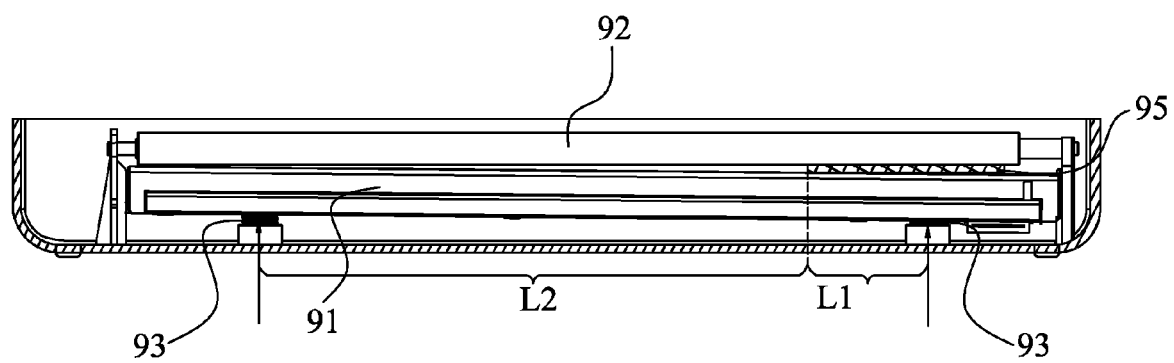
FIG. 2 is a cross-sectional view showing that a small, thick and hard card is being scanned by the conventional scanning device of FIG. 1.
Figure 3:
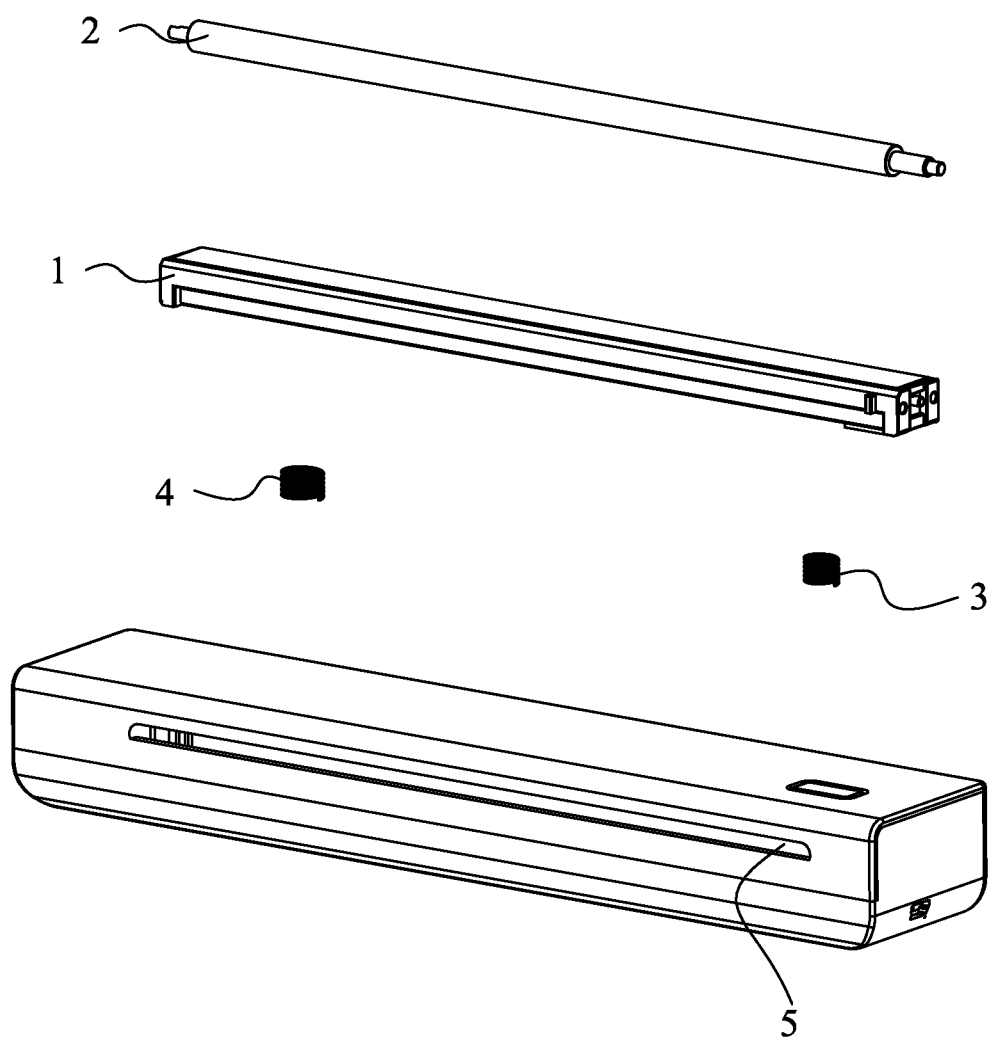
FIG. 3 is an exploded perspective view of a scanning device according to an embodiment of the present invention.
Figure 4:
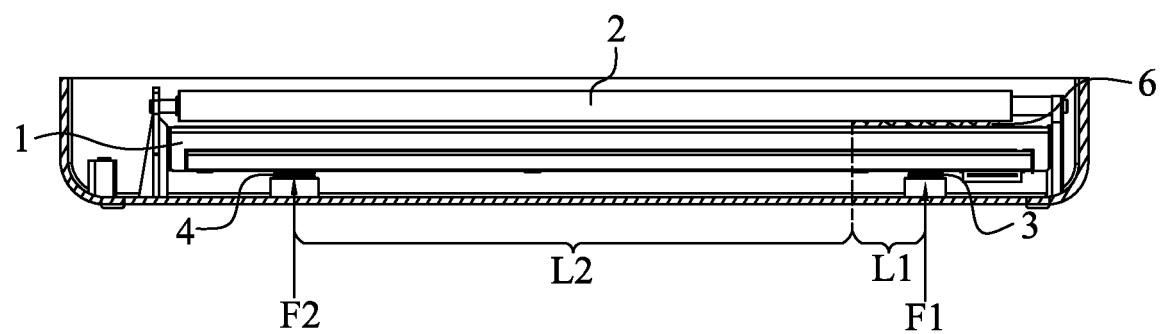
FIG. 4 is a cross-sectional view showing that a small, thick and hard card is being scanned by the scanning device of FIG. 3.

With reference to FIG. 3 and FIG. 4, a scanning device according to a first embodiment of the present invention is described below. The scanning device has a paper-feeding inlet 5 through which a sheet-like medium is inserted into and moves through the scanning device. The sheet-like mediums are substantially divided into two categories which are designated as first sheet-like mediums, such as paper documents, and second sheet-like mediums 6 smaller and thicker than the first ones, such as identity cards and bank cards.

The scanning device includes a block-shaped scanning platform 1, a feed roller 2 rotatably mounted above the scanning platform 1 for clamping the sheet-like medium therebetween, a first elastic element 3 and a second elastic element 4 located under two opposite ends of the scanning platform 1 to press the scanning platform 1 upward against the feed roller 2. The force F1 of the first elastic element 3 acting on the scanning platform 1 is greater than the force F2 of the second elastic element 4 acting on the scanning platform 1. The scanning device defines a scanning direction along a long side of the scanning platform 1 namely a long side of the paper-feeding inlet 5. An end sidewall of the paper-feeding inlet 5 near to the first elastic element 3 is defined as a datum end. In use, the sheet-like medium is inserted into the paper-feeding inlet 5 with one edge thereof being against the datum end, and the feed roller 2 rotates to bring the sheet-like medium across the scanning platform 1 so as to make one side of the sheet-like medium be scanned by the scanning platform 1 successively along the scanning direction and be converted into a digital image.

Referring to FIG. 3 and FIG. 4, in the first embodiment, the first elastic element 3 and the second elastic element 4 are coil springs, and the first elastic element 3 has a greater spring constant than the second elastic element 4.

When the scanning device is used to scan the second sheet-like mediums 6 having small, thick and hard features, in order to avoid the scanning platform 1 slanting by taking a bottom corner of the second sheet-like medium 6 away from the datum end as a fulcrum, the first elastic element 3 is required to have a greater spring constant than the second elastic element 4. In detail, according to moment balance principle and Hooke's law:

$$F1 \times L1 = F2 \times L2 ==> K1 \times \Delta X1 \times L1 = K2 \times \Delta X2 \times L2$$

where L1 <L2, $\Delta X1 = \Delta X2$
as a result, K1 >K2 that is to say the first elastic element 3 is required to have a greater spring constant than the second elastic element 4. When the above conditions are satisfied, a moment balance is achieved at two sides of the fulcrum to keep the scanning platform 1 level and further ensure the second sheet-like medium 6 is straightly transmitted in the process of being scanned.

In order to satisfy K1 >K2, namely the spring constant of the first elastic element 3 is greater than that of the second elastic element 4, the following methods may be taken:

(1) when the other parameters are the same, the spring wire of the first elastic element 3 has a greater diameter than the one of the second elastic element 4;

(2) when the other parameters are the same, the outside diameter of the first elastic element 3 is smaller than the one of the second elastic element 4; or (3) when the other parameters are the same, the first elastic element 3 has more effective number of turns than the second elastic element 4.

Figure 5:
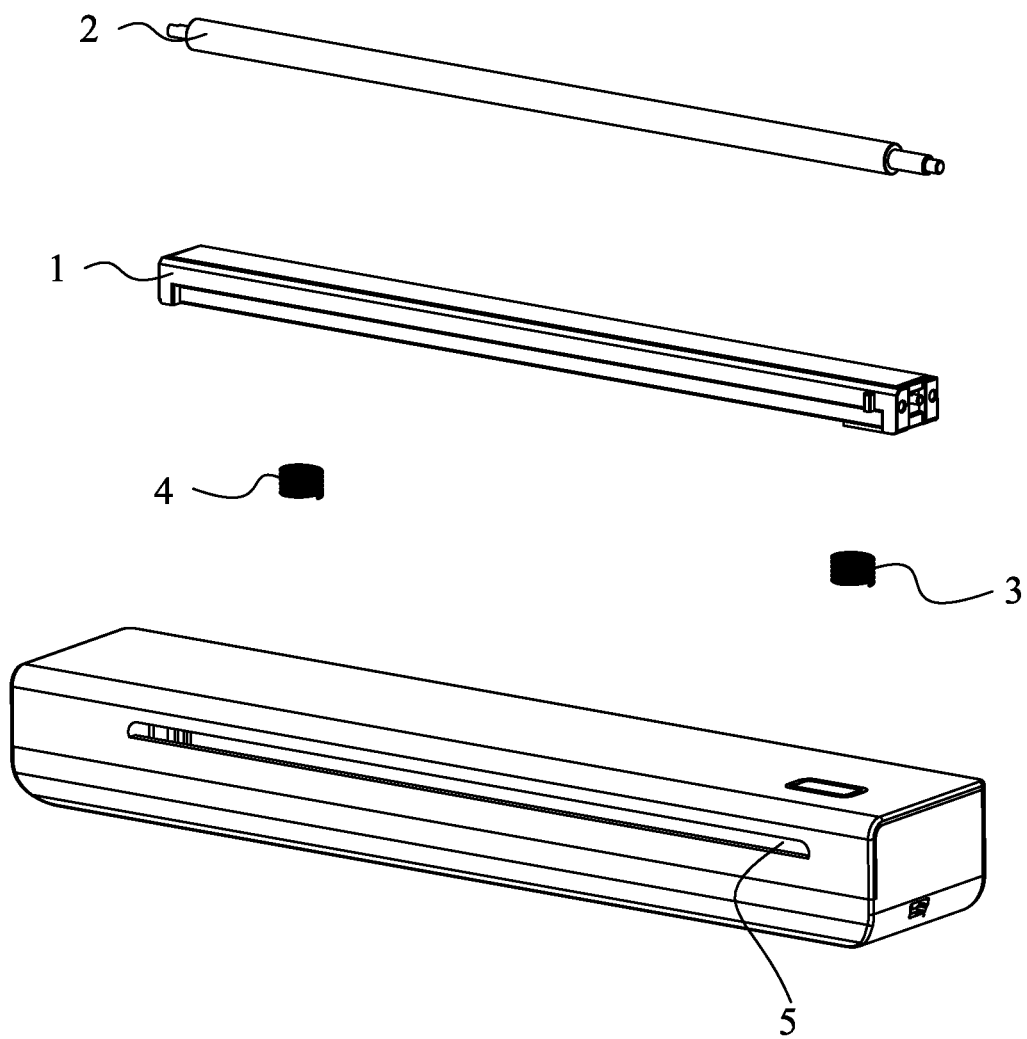
FIG. 5 is an exploded perspective view of a scanning device according to another embodiment of the present invention.

With reference to FIG. 5, it shows a second embodiment of a scanning device according to the present invention. Compared to the first embodiment, the differences are that the force of the first elastic element 3 acting on the scanning platform is equal to that of the second elastic element 4 acting on the scanning platform, the first elastic element 3 and the second elastic element 4 have the same spring constant, and the distance from the first elastic element 3 to the datum end is smaller than that from the second elastic element 4 to the other end sidewall of the paper-feeding inlet 5.

When the second sheet-like medium 6 having small, thick and hard features is scanned by the above scanning device, the distance from the first elastic element 3 to the datum end is smaller than that from the second elastic element 4 to the other end sidewall of the paper-feeding inlet 5, and the second sheet-like medium 6 enters into the scanning device by being against the datum end. That makes the first elastic element 3 directly act on the second sheet-like medium 6 through the scanning platform 1 to ensure the second sheet-like medium 6 is levelly transmitted in the process of being scanned.

As described above, the scanning device of the present invention utilizes that the first elastic element 3 near to the datum end of the scanning device has a greater spring constant than the second elastic element 4 to make the torques at two sides of the bottom corner of the second sheet-like medium 6 balance, or that the distance from the first elastic element 3 to the datum end is smaller than that from the second elastic element 4 to the other end sidewall of the paper-feeding inlet 5 to make the first elastic element 3 directly act on the second sheet-like medium 6 through the scanning platform 1, so as to ensure the second sheet-like medium 6 is levelly transmitted in the process of being scanned. So, a good scanning quality can be finally achieved by the scanning device.

What is claimed is:

1. A scanning device having a paper-feeding inlet through which a sheet-like medium is inserted into and moves through the scanning device, the sheet-like mediums being substantially divided into two categories which are designated as first sheet-like mediums and second sheet-like mediums smaller and thicker than the first ones, the scanning device comprising:

- a block-shaped scanning platform, the scanning device defining a scanning direction along a long side of the scanning platform namely a long side of the paper-feeding inlet;
- a feed roller rotatably mounted above the scanning platform for clamping the sheet-like medium therebetween; and
- a first elastic element and a second elastic element located under two opposite ends of the scanning platform to press the scanning platform upward against the feed roller, wherein the force of the first elastic element acting on the scanning platform is equal to that of the second elastic element acting on the scanning platform, one end sidewall of the paper-feeding inlet near to the first elastic element is defined as a datum end for guiding the sheet-like medium to be inserted into the paper-feeding inlet, the distance from the first elastic element to the datum end is smaller than that from the second elastic element to the other end sidewall of the paper-feeding inlet,
- in use, the feed roller rotates to bring the sheet-like medium across the scanning platform so as to make one side of the sheet-like medium be scanned by the scanning platform successively along the scanning direction and be converted into a digital image.

2. The scanning device as claimed in claim 1, wherein the first elastic element and the second elastic element are coil springs and have the same spring constant.

\* \* \* \* \*